Sept. 28, 1937.  C. G. VEINOTT  2,094,386
MOTOR PROTECTIVE DEVICE
Filed June 27, 1934
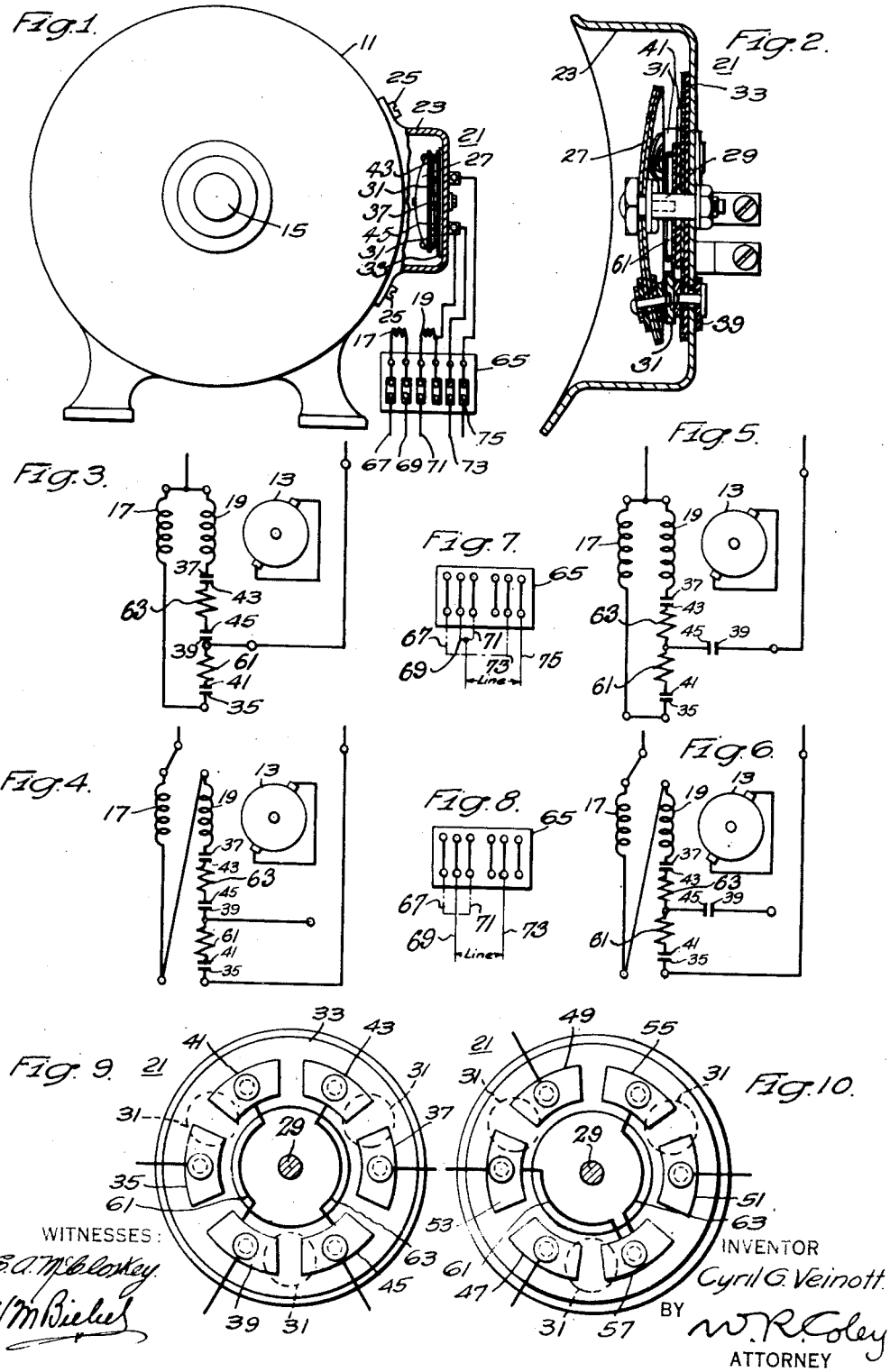
WITNESSES:
E. A. McCloskey
H. M. Bielel
INVENTOR
Cyril G. Veinott
BY
W. R. Coley
ATTORNEY Patented Sept. 28, 1937

2,094,386

UNITED STATES PATENT OFFICE 2,094,386

MOTOR PROTECTIVE DEVICE

Cyril G. Veinott, Springfield, Mass., assignor to Westinghouse Electric & Manufacturing Company, East Pittsburgh, Pa., a corporation of Pennsylvania Application June 27, 1934, Serial No. 732,679

8 Claims. (Cl. 175—294)

My invention relates to electric motors and particularly to temperature control devices and systems for alternating-current dual-voltage motors.

An object of my invention is to provide a relatively simple control device and system for an alternating-current motor having a plural-section energizing winding.

Another object of my invention is to provide an easily and quickly connectible motor to permit of operating the same from either a high-voltage supply circuit or a low-voltage supply circuit without change in the connections of an electrical protective device.

Another object of my invention is to provide a relatively simple control device and system that shall inherently recognize the presence of an unbalanced condition in the parallel-connected energizing winding sections to disconnect the motor from the supply circuit quicker than otherwise.

Other objects of my invention will either be specifically pointed out hereinafter or will be evident from the following description of the device and system embodying my invention which I now prefer to use.

In practicing my invention I provide a plural-contact thermal switch having a thermally actuable element therein, a pair of auxiliary heating elements to energize the thermal element, and selectively connect the contact members and terminals in the thermal switch in a plurality of separate circuits.

In the single sheet of drawings:

Figure 1 is a view of a motor shown in end elevation with which is associated a device and system embodying my invention;

Fig. 2 is a view in lateral section through a thermal switch embodying my invention;

Fig. 3 is a diagram of connections of the system embodying my invention shown having parallel connected energizing windings;

Fig. 4 is a view similar to Fig. 3 but showing the two sections of the energizing winding connected in series circuit with each other;

Fig. 5 is a view similar to Fig. 3 but showing a modified form of control circuit;

Fig. 6 is a view similar to Fig. 4 showing the sections of the energizing winding of Fig. 5 connected in series circuit relation relatively to each other;

Fig. 7 is a schematic view of a terminal board showing the connections to be made thereto for a low-voltage supply circuit;

Fig. 8 is a view similar to Fig. 7 but showing the connections to be utilized when the motor is energized from a supply circuit of higher voltage;

Fig. 9 is a view in front elevation of the base portions and the fixed contact terminals and contact members of the device shown in section in Fig. 2; and Fig. 10 is a view similar to Fig. 9 but showing a modified forms of thermal switch parts.

I have elected to show and describe my invention as applied more particularly to a dual voltage repulsion-induction motor. A frame or stator structure 11 is shown in end elevation in Fig. 1 of the drawing, and it is to be understood that this may be any well-known type of frame or stator structure, and that there is associated therewith a rotor 13 shown generally in Figs. 3, 4, 5 and 6 of the drawing, of the type used in repulsion induction motors and represented generally by a rotor shaft 15 in Fig. 1 of the drawing. The main energizing winding of motor 11 includes two sections 17 and 19, which are shown schematically in Figs. 3 to 6 of the drawing, and are also shown generally only in Fig. 1 of the drawing, and I desire it to be understood that these are of the kind usually employed in dual-voltage repulsion-induction motors.

A thermally-actuable switch 21 (see Figs. 1, 2 and 9) includes a casing 23 which may be of cup-shape and of such design and construction that it may be secured to the frame structure 11 as by a plurality of small machine screws 25. While I have shown the thermal switch 21 as secured against the outside frame of the motor structure, I do not desire to be limited thereto, as the casing 21 may be made such as to be secured directly against the stator laminations (not shown in the drawing).

The thermal switch 21 includes further a snap-acting bimetal disc 27 which I preferably make of the type disclosed and claimed in Patent No. 1,480,240 to J. A. Spencer. The central portion of disc 27 is supported by an adjustable stud 29 from a suitable base which, in this instance, may be the central portion of dished member or casing 23. A plurality, in this instance three, of contact bridging members 31 are insulatedly mounted on and supported by the disc at the periphery thereof, and these contact bridging members cooperate with a plurality of peripherally-spaced contact members and contact terminals mounted on the central portion of dished member 23 and insulated therefrom by plates of electric-insulating material 33.

I have shown two modifications of arrangements of fixed contact members and terminals in Figs. 9 and 10 of the drawing. The construction shown in Fig. 9 of the drawing includes a plurality of contact terminals 35, 37 and 39, as well as a plurality of fixed contact members 41, 43 and 45. These contact members and contact terminals are located in peripherally spaced positions against a sheet of mica 33, one of the contact bridging members 31 being adapted in one position of bimetal disc 27 to electrically connect contact terminal 35 and contact member 41, contact terminal 37 being electrically connected with contact member 43 by a second bridging member 31, and contact terminal 39 being electrically connected to electrical contact member 45 by a third bridging member 31.

Referring now to Fig. 10 of the drawing, three contact terminals 47, 49 and 51 are peripherally spaced from each other, and contact members 53, 55 and 57 are located in spaced cooperative relation thereto. One of the contact bridging members 31 is adapted to connect terminal 49 with contact member 53; another bridging member 31 is adapted to connect terminal 51 with contact member 55; while the third bridging member 31 is adapted to connect terminal 47 with contact member 57.

As it is desired to thermally affect or influence the disc 27 not only in accordance with the heat generated or liberated in the energizing winding and in the stator laminations but also by means controlled by the current traversing the two sections of the energizing winding, I provide the thermal switch 21 with two auxiliary low-wattage resistors or heating elements 61 and 63 which, in the device shown in Fig. 9 of the drawing, extend respectively from terminal 39 to contact member 41 and between contact members 43 and 45, while these heating elements extend between contact members 53 and 57 and between contact members 55 and 57, respectively, in the device shown in Fig. 10 of the drawing.

In order to illustrate the various connections between the terminals of the energizing winding and the terminals of the thermal switch, I have shown in Fig. 1 of the drawing a terminal board 65 having a plurality of terminals thereon to which are connected not only the ends of the energizing winding sections but also certain terminals of the thermal switch. I have shown terminal connections 67, 69, 71, 73 and 75, to which are connected in the manner shown the following: the ends of winding 17 are connected to terminals 67 and 69. One terminal of winding 19 is connected to terminal 71, while the other end of winding 19 is connected to contact terminal 37 on the thermal switch 21. Contact terminal 37 is also connected to terminal 73 on board 65, while terminal 39 on switch 21 is connected to contact terminal 75 on the board 65.

Reference to Fig. 7 of the drawing will show how the respective terminals on the terminal board 65 are to be connected together in order to obtain the diagram of connections shown in Fig. 3 of the drawing. From the diagram of Fig. 3, it will be noted that one switch or one double gap is connected in series circuit with coil or winding 17, while two such switches are connected in series circuit with winding 19, the junction in this instance, contact terminal 39, being connected to one of the supply circuit conductors. By one switch is meant in this particular instance a cooperating bridging member and two fixed contacts, one of these being a contact member and the other a contact terminal. In other words, when disc 27 is actuated to its open position, there will be two gaps only effective to open the circuit of winding 17, while four such gaps will be effective in the circuit of coil 19.

Reference to Figs. 4 and 8 of the drawing will show the schematic diagram of connections of the internal circuits of the motor and the thermal switch and also of the external connections on the terminal board 65 to permit of operating the motor 11 from a high-voltage circuit, which, for illustrative purposes, may be assumed to be either 220 or 440 volts if the voltage of the supply circuit for the diagram of connections shown in Fig. 3 is assumed to be either 110 or 220 volts. It will be noted that the control of the energizing circuit of the motor is now affected by a total of six gaps in series with each other.

Referring now to Fig. 5 of the drawing, I have there illustrated a modified form or system using the construction of the thermal switch shown more particularly in Fig. 10 of the drawing. In this case, two gaps of the switch in series circuit with the winding 17 are in series circuit with two other gaps of the thermal switch, the same comment holding with regard to the two gaps directly in series circuit with winding 19.

Referring now to Fig. 6 of the drawing, I have there illustrated a diagram of connections of the parts shown connected in parallel in Fig. 5 of the drawing, and it will now be noted that only a total of four gaps of the thermal switch are active in interrupting the high-voltage circuit to which the motor is connected.

It will, therefore, be evident that while the device shown particularly in Fig. 9 of the drawing and utilized in the two connections shown in Figs. 3 and 4, favors the series connection in that a total of six gaps are connected in series circuit with each other on the high-voltage, while only two gaps are connected in one of the parallel circuits, the diagrams of connections shown in Figs. 5 and 6 favor the parallel circuit connection. Reference to Fig. 5 of the drawing will show that each of the two parallel circuits has, in effect, four gaps effective to interrupt the circuit.

It will be noted that only the relatively slight changes shown in Figs. 7 and 8 of the drawing and more particularly the use of one or two jumpers are necessary to effect proper connection of the inner parts of the motor circuit, and it is to be further noted that the auxiliary heating elements mounted in a proper manner in heat radiating relation to the thermal element will be properly effective irrespective of whether the motor is operating on a high-voltage or on a low-voltage energizing circuit.

The control system embodying my invention has one important advantage which is now to be more clearly described. Let it be assumed that the motor 11 has a normal rated capacity of 10 amperes at 220 volts or of 20 amperes at 110 volts. In other words, its normal rated capacity is on the order of 2.5 horsepower. Let it further be assumed that the resistance of each of the auxiliary heating elements 61 and 63 is .025 ohm. I wish to point out here that these figures are assumed for the purposes of illustration only in order to more clearly set forth the operation of my thermal device not only when the two sections of the energizing winding are connected in series circuit with each other, as shown in Figs. 4 and 6 of the drawing, but also when they are connected in parallel circuit with each other, as shown in Figs. 3 and 5 of the drawing, when they are operable at a lower voltage.

When the two sections of the energizing winding are connected in series, the total amount of electric energy transformed into heat in the two auxiliary heating elements 61 and 63 will easily be seen to be calculable as follows:

$10^2$ (amperes) $\times$ .05 (resistance of auxiliary heaters in series) =5 watts It is, of course, to be understood that this amount of electric energy transformed into heat by the auxiliary heaters 61 and 63 when added to such heat as is transmitted to the disc 27 by the frame structure does not cause opening of the circuit, such opening being effected only in case of much greater currents in the motor circuit.

Let it now be assumed that the motor is operating on a low-voltage supply circuit with the two sections of the energizing winding connected in parallel circuit with each other. Let it be assumed further that for some reason there is a difference in the values of currents traversing the two sections of the energizing winding, and let it be assumed that these current values are 15 amperes in the one winding and 5 amperes in the other winding, the total being that for the normal rated output of the motor. A calculation of the amount of electric energy transformed into heat in the two auxiliary heating elements will show that this value is 6.25 watts. If the unbalance becomes such as to cause 18 amperes to flow in one section of the winding and one of the auxiliary heating elements and 2 amperes in the other, a similar calculation will now show that 8.2 watts are transformed into heat. In case of a burnout in one of the winding sections, and in case the other section is called upon to carry the total of 20 amperes, the amount of electric energy transformed into heat in the one auxiliary heating element is 10 watts, or double the amount when the motor circuits are properly operative.

It is thus evident that the thermal switch will be operated sooner in case of an unbalanced condition in the two sections of the energizing winding, and it may further be pointed out that this is a very desirable characteristic as it is, of course, undesirable to continue operation with all of the energizing current traversing a single winding only when operating with the two sections in parallel with each other.

The device and system embodying my invention thus provide a relatively simple, highly efficient and easily connected means for properly protecting a dual voltage motor against excessive currents resulting from any cause whatever.

Various further modifications may be made in the device embodying my invention without departing from the spirit and scope thereof, and I desire, therefore, that only such limitations shall be placed thereon as are imposed by the prior art or are set forth in the appended claims.

I claim as my invention:

1. In a temperature control system for a dual voltage motor having a plural-section field winding, a stator and a frame, a thermal switch having means to secure it to the motor, a plurality of contact members in the switch, means to connect the contact members in circuit with the sections of the field winding and a pair of auxiliary heating elements in the thermal switch permanently connected in series circuit with the respective sections of the field winding.

2. In a temperature control system for a dual voltage motor having a frame, a stator and a plural-section energizing winding, a thermally actuable switch having means to secure it against the frame, a plurality of contact members in the switch, means to connect the contact members in electric series circuit with the respective sections of the energizing winding, and heating means in the thermal switch traversed by the currents flowing through the sections of the energizing winding and effective to provide greater amounts of heat to the switch for unbalanced current conditions in the two sections than for balanced current conditions therein.

3. In a temperature control system for a dual voltage motor having a frame structure and a plural-section energizing winding, a thermal switch adapted to be mounted in heat-receiving location on the frame and comprising a plurality of fixed contact members, a plurality of movable contact members cooperating with the fixed contact members to establish and interrupt a plurality of separate circuits, a bimetal disc supporting and actuating the movable contact members, a plurality of auxiliary heating elements in the thermal switch electrically connected between fixed contact members of different circuits, and conductors connecting the fixed contact members and the auxiliary heating elements in series circuit with the respective sections of the energizing winding.

4. In a temperature control system for a dual voltage motor including a frame structure and a plural-section energizing winding, a thermal switch adapted to be mounted in heat-receiving relation on the frame and comprising an equal number each of fixed contact terminals and fixed contact members spaced from each other, thermally-actuated movable contact-bridging members adapted to individually engage with a fixed contact terminal and a fixed contact member, and a plurality of auxiliary heating elements electrically connected between respective pairs of contact members and traversed by the current traversing the sections of the energizing winding and effective to cause operation of the thermal switch.

5. In a temperature control system for a dual voltage motor including a frame structure and a plural-section energizing winding, a thermal switch adapted to be mounted in heat-receiving relation on the frame and comprising three fixed contact terminals and three fixed contact members spaced apart from each other, conductors between certain of the contact terminals and the sections of the energizing winding, a bimetal disc, three contact bridging members on the disc movable thereby into engagement with a contact terminal and a contact member, respectively, and two auxiliary heating elements in series circuit with certain of said contacts, traversed by the current traversing the sections of the energizing winding and adapted to heat the bimetal disc to cause opening of the circuit of the energizing winding.

6. In a temperature control system for a dual-voltage motor having a plural-section field winding, a thermal switch device in heat-responsive relation to a portion of said motor, and different circuit connections for said motor for different voltage operations, including parallel and series connections of said field-winding sections, to permit said thermal switch device to protect the winding sections during these different voltage operations.

7. In a temperature control system for a dual-voltage motor having a plural-section field winding, a thermal switch device in heat-responsive relation to a portion of said motor and having a plurality of gaps, means for applying one of said dual voltages between a junction-point of said sections and a point between two of said gaps respectively connected to said sections, means for connecting said sections in series, and means for applying the other dual voltage to the outer terminal of the series-connected sections and to a point having said gaps between it and said sections.

8. In a temperature control system for a dual-voltage motor having a plural-section field winding, a thermal switch device in heat-responsive relation to a portion of said motor and having a plurality of gaps and a plurality of heating elements, means for applying one of said dual voltages between a junction-point of said sections and a point having a heating element and a gap on each side connected to the respective sections, means for connecting said sections in series, and means for applying the other dual voltage to the outer terminal of the series-connected sections and to a point having said gaps and said heating elements between it and said sections.

CYRIL G. VEINOTT.